US012359758B2

(12) United States Patent
Marques Barroca et al.

(10) Patent No.: US 12,359,758 B2
(45) Date of Patent: Jul. 15, 2025

(54) QUICK-COUPLING FEMALE ELEMENT

(71) Applicant: STAUBLI FAVERGES, Faverges-Seythenex (FR)

(72) Inventors: Serafim Marques Barroca, Frontenex (FR); Christophe Durieux, Gilly sur Isere (FR)

(73) Assignee: STAUBLI FAVERGES, Faverges-Seythenex (FR)

(*) Notice: Subject to any disclaimer, the term of this patent is extended or adjusted under 35 U.S.C. 154(b) by 45 days.

(21) Appl. No.: 18/240,575

(22) Filed: Aug. 31, 2023

(65) Prior Publication Data

US 2024/0084939 A1 Mar. 14, 2024

(30) Foreign Application Priority Data

Sep. 8, 2022 (FR) .................................. 2208994

(51) Int. Cl.
*F16L 37/413* (2006.01)
*F16L 37/12* (2006.01)
(Continued)

(52) U.S. Cl.
CPC .......... *F16L 37/413* (2013.01); *F16L 37/122* (2013.01); *F16L 37/22* (2013.01); *F16L 37/40* (2013.01)

(58) Field of Classification Search
CPC ....... F16L 37/122; F16L 37/138; F16L 37/12; F16L 37/413; F16L 37/42; F16L 37/22;
(Continued)

(56) References Cited

U.S. PATENT DOCUMENTS 2,279,146 A * 4/1942 Schneller ................ F16L 37/40
  251/149.6
3,188,123 A * 6/1965 Hansen .................... F16L 37/22
  285/341
(Continued)

FOREIGN PATENT DOCUMENTS

DE  1525854 A1  1/1970

OTHER PUBLICATIONS

FR 2208994; Preliminary Searhc Report mailed Mar. 22, 2023.

*Primary Examiner* — Atif H Chaudry
(74) *Attorney, Agent, or Firm* — MARSHALL, GERSTEIN & BORUN LLP

(57) ABSTRACT

Quick-coupling female element. The female element includes a nipple configured for being fitted into a hose and which is rigidly attached to a hollow body extending along a longitudinal axis and which defines a receiving volume. Radial openings provided in the body along a guide axis emerge into the receiving volume and each receive a lock which is guided in translation between a locking position and an unlocking position. The female element includes an operating ring mounted to slide around the body between a locking position and an unlocking position and which comprises guide grooves which cooperate with pins of each lock. The guide grooves associated with each lock are geometrically supported by a guide plane inclined with respect to the longitudinal axis, so that each lock is driven between the locking and unlocking positions thereof when the operating ring is moved between the locking and unlocking positions thereof.

16 Claims, 11 Drawing Sheets

(51) Int. Cl.
*F16L 37/22* (2006.01)
*F16L 37/40* (2006.01)

(58) Field of Classification Search
CPC ... F16L 33/225; F16L 37/0841; F16L 37/086; F16L 33/227
See application file for complete search history.

(56) References Cited

U.S. PATENT DOCUMENTS

| | | | | |
|---|---|---|---|---|
| 3,666,300 | A * | 5/1972 | Russell | F16L 37/42 285/316 |
| 5,309,991 | A * | 5/1994 | Watkins | E21B 33/03 285/309 |
| 6,062,606 | A | 5/2000 | Carpini et al. | |
| 2007/0278791 | A1 | 12/2007 | Tiberghien et al. | |

* cited by examiner

QUICK-COUPLING FEMALE ELEMENT

FIELD OF THE DISCLOSURE

The present invention relates to a quick-coupling female element.

BACKGROUND

Quick-couplings are fluidic coupling devices comprising a female element and an associated male element. Each of the male and female elements comprises an internal passage, the internal passages being in fluidic communication when the coupling is in a coupled configuration. The female element most often comprises a locking device which engages during the coupling of the male and female elements, so as to keep the coupling in the coupled configuration, hence the name of quick-coupling.

Herein, we are interested in cases where the male element is a hose wherein a fluid circulates under high pressure. Such quick locking devices carry a risk of accidental uncoupling under pressure, which could be a source of failure or incident for the installation.

In some applications, the hose is coupled to the female element and then repeatedly uncoupled. Furthermore, the pipes are generally made of polymer material and have slightly variable thicknesses.

It is known how to use balls or rings which come into contact with the external surface of a pipe and penetrate into the external wall of the pipe to lock the pipe into the female element. Such type of locking concentrates locking forces on small surfaces, which tends to mark the pipe or fail to induce sufficient gripping force for retaining the pipe into the female element.

For example, it is known from DE1525854 how to use a pipe coupling comprising a hollow coupling tube rigidly attached to a body of a female coupling element, and an external ring held elastically on the front of the female element. The ring comprises an internal clamp which pinches the tube directly onto the nipple. The external ring is held on the front by a spring which presses the hose against the nipple, via the internal clamp. To unlock the coupling, the operator has to apply an axial traction on the ring. The cooperation of the clamp and of the nipple has the disadvantage of marking the pipe and stressing same axially by friction, in addition to representing too great a tensile force to be applied by the user. On the other hand, the direct application of a reduced force of the spring, through the ring, does not represent a reliable means of retaining the pipe during the establishment of the pressure.

SUMMARY

Such are the problems the invention intends more particularly to overcome, by proposing a quick-coupling female element providing a secure coupling, including on pipes having slightly variable thicknesses.

For this purpose, the invention relates to a quick-coupling female element, configured for being coupled to a hose, the female element comprising:
  a body:
    which extends along a longitudinal axis and which defines a volume for receiving the hose, the receiving volume having a shape of revolution about the longitudinal axis and jutting from the body through a mouth, the mouth defining a front side of the female element,
    which comprises an abutment surface, which is located in a plane orthogonal to the longitudinal axis and which is oriented towards the front of the female element, the abutment surface delimiting the volume for receiving the rear side of the female element, the rear side being opposite the front side, and
  a nipple:
    which is rigidly attached to the body of the female element, and which extends into the receiving volume from the abutment surface,
    which comprises a hollow body having a shape of revolution about the longitudinal axis, the hollow body defining a channel which emerges on the front side of the female element and into a passage in the female element on the rear side, and
    which comprises an external surface.
  According to the invention, the female element further comprises:
    at least one radial opening, each radial opening being provided in the body of the female element along a guide axis radial to the longitudinal axis, each radial opening jutting into the receiving volume, and
    at least one lock, each lock being received in a respective radial opening and being movable in translation with respect to the body along the corresponding guide axis between a first position, wherein the lock penetrates into the receiving volume, and a second position, wherein the lock is further away from the longitudinal axis than in the first position, each lock comprising an internal surface for clamping the pipe, oriented towards the longitudinal axis opposite the external surface of the nipple, and
    a return member, configured for returning each lock to the first position thereof, and
    an operating ring which is arranged around the body coaxially with the longitudinal axis and which is movable in translation with respect to the body along the longitudinal axis between a locking position and an unlocking position,
  whereas:
    each lock comprises pins, each extending along a direction orthogonal to the corresponding guide axis and orthoradial to the longitudinal axis,
    the operating ring comprises guide grooves, which cooperate with the pins of each lock, the guide grooves associated with each lock being geometrically supported by a guide plane inclined with respect to the longitudinal axis, so that:
    each lock is driven from the second position thereof to the first position thereof when the operating ring is moved from the unlocking position thereof to the locking position thereof, and
    each lock is driven from the first position thereof to the second position thereof when the operating ring is moved from the locking position thereof to the unlocking position thereof.

By means of the invention, the movements of the locks are controlled by the operating ring, abut against the pipe and exert a pressing force orthogonal to the longitudinal axis, reducing the risks of marking the pipe. In the event of repeated couplings and uncouplings, the risk of leaks and/or breakage of the pipe is reduced. Furthermore, the movement of the locks compensates for dimensional plays, more particularly variations of thicknesses in pipes. The pressing force, which is exerted by the return member and transmitted through the locks, depends little on the variations of thickness in pipes, the coupling thereby being secure. Finally, the use of inclined guide grooves is used, through force enhancement, for applying a significant locking force on the pipe without degrading the ease of disconnection of the coupling by the operation of the locking ring.

According to advantageous but non-mandatory aspects of the invention, such a female element can incorporate one or a plurality of the following features, taken individually or according to any technically permissible combination:

The return member is configured for returning the operating ring to the locking position thereof, and in that the operating ring drives each lock to the first position thereof when the return member returns the operating ring to the locking position thereof.

The guide grooves move away from the longitudinal axis as same move towards the front of the female element, the unlocking position of the operating ring being a position axially retracted, along the longitudinal axis, with respect to the locking position.

The return member applies a centripetal force to each lock, which tends to move each lock from the second position thereof to the first position thereof.

The nipple has a circumferential bulge which is radially aligned with the internal clamping surface of each lock with respect to the longitudinal axis.

The internal clamping surface of each lock extends geometrically from the rear side of a first clamping plane, which is orthogonal to the longitudinal axis, whereas the nipple comprises a circumferential bulge, which is provided on the external surface of the nipple and which is located at the front of the first clamping plane of each lock.

The circumferential bulge comprises:
a flared proximal portion, which diverges towards the front of the female element and which is arranged opposite each lock, and
a flared distal portion diverging toward the rear of the female element.

The proximal portion of the bulge is delimited rearwards by a second clamping plane, which is parallel to the first clamping plane, whereas the first clamping plane and the second clamping plane are separated by an interval of less than 5 mm, preferentially less than 2 mm.

The external surface of the nipple comprises a clamping portion, which is located behind the proximal portion of the circumferential bulge and which extends opposite the internal clamping surface of each lock, whereas the clamping portion and the internal surface define an annular clamping space therebetween, and the clamping portion has the shape of a cylinder of circular cross-section.

The female element comprises:
a valve, which is partially received in the passage and which is movable with respect to the body between a forward position, wherein the valve closes the passage, and a retracted position, wherein the valve does not close the passage,
a second return member, which returns the valve to the forward position,
whereas the valve is configured for moving from the forward position to the retracted position when a pipe is fitted on the nipple and abuts against the abutment surface.

The body has a housing, which opens onto the abutment surface, whereas the female element comprises a control member which is received in the housing and which is movable in translation with respect to the body parallel to the longitudinal axis, between a jutting position, wherein a front portion of the control member emerges from the abutment surface, and a retracted position, wherein the front portion does not emerge from the abutment surface, and that the control member is configured for pushing the valve from the forward position to the retracted position when the hose is fitted on the nipple and moves the front portion of the control member from the jutting position to the retracted position thereof.

The body comprises a first viewing port,
which extends through the body along a viewing axis radial to the longitudinal axis,
which is provided at the front of the abutment surface, the first port jutting into the receiving volume,
whereas the first port is arranged so as to let the control member in the jutting position be observed through the first port.

The operating ring comprises a second view port which extends through the operating ring along an axis of passage parallel to the viewing axis, whereas the second port is arranged so as to coincide with the first port, when the operating ring is in the unlocking position, so as to let the control member in the jutting position be observed through the first port.

The operating ring comprises a transparent portion, the transparent portion covering the first port and the second port when the operating ring is in the unlocking position.

The female element comprises a lever which is mounted movable in rotation with respect to the body about a pivot axis between a jutting position and a lowered position, the pivot axis being orthoradial to the longitudinal axis, whereas the lever comprises a guide portion which cooperates with the operating ring in such a way so as to drive the operating ring from the locking position to the unlocking position when the lever is driven about the pivot axis thereof between the jutting position thereof and the lowered position thereof.

BRIEF DESCRIPTION OF THE DRAWINGS

The invention will be better understood and other advantages thereof will appear more clearly in the light of the following description of an embodiment of a quick-coupling female element according to the principle thereof, given only as an example and made with reference to the enclosed drawings, wherein.

DETAILED DESCRIPTION

Figure 1:
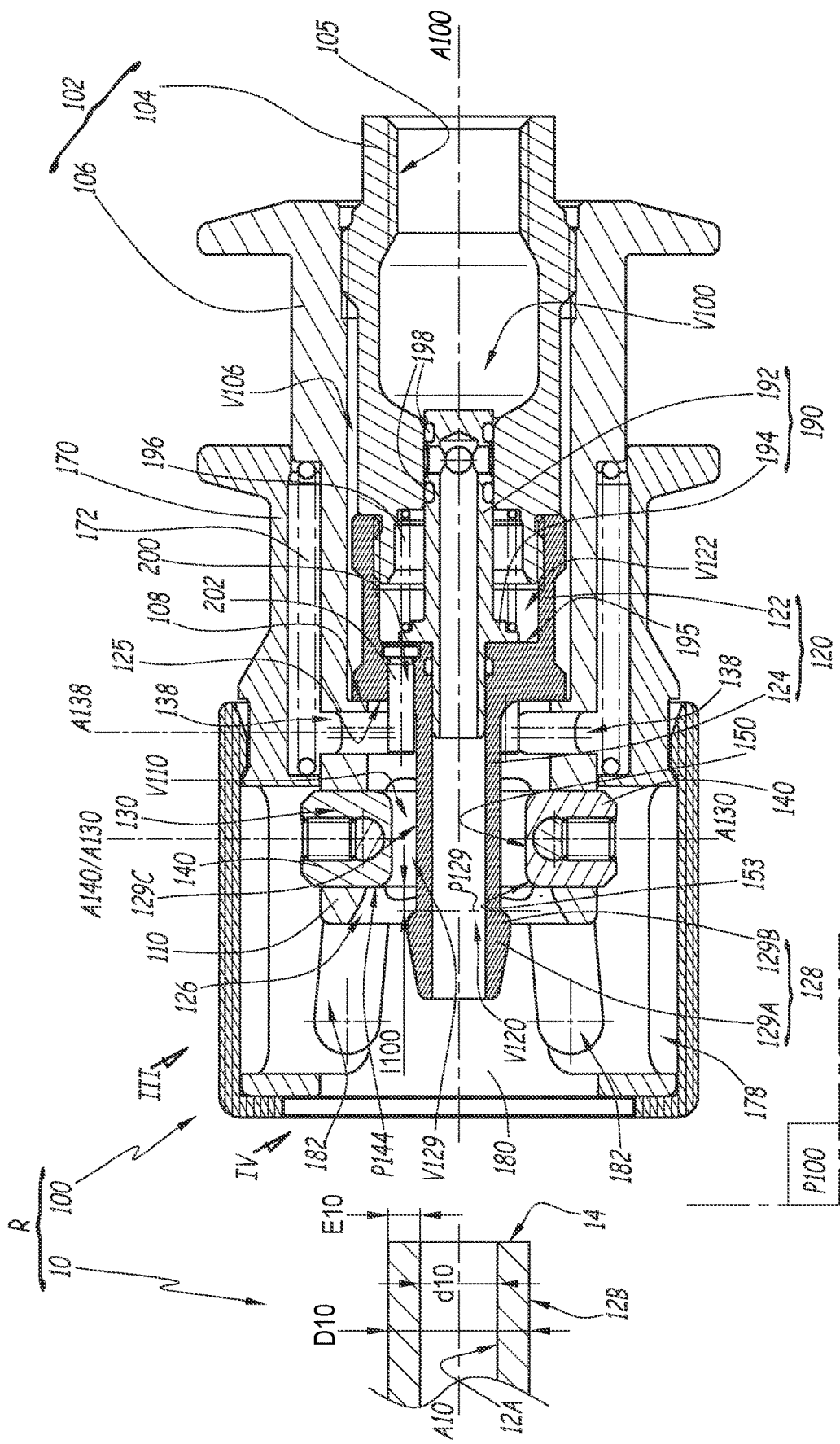
FIG. 1 is a longitudinal section of a quick-coupling according to a first embodiment of the invention, comprising a female element and an associated male element, represented in a first so-called uncoupled configuration.

FIG. 1 shows a coupling R which comprises a male element, herein a pipe 10, on the left of FIG. 1, and an associated female element 100, on the right of FIG. 1. The coupling R is shown herein in an uncoupled configuration, wherein the pipe 10 and the female element 100 are separated from each other.

The pipe 10 is a hose. Only one end portion of the pipe 10 is shown in the figures, the end portion being considered rectilinear. The hose 10 is centered herein on a pipe axis A10. The hose 10 comprises an internal surface 12A, of cylindrical shape with a circular cross-section and characterized by an internal diameter d10, an external surface 12B, also of cylindrical shape with a circular cross-section and characterized by an external diameter D10. The hose 10 also has a front face 14, which connects the internal surface 12A and the external surface 12B and which is oriented towards the female element 100 during the coupling of the female element 100 to the hose 10. The hose 10 has a thickness E10 measured radially to the axis A10, between the external surface 12B and the internal surface 12A. The hose 10 is made of an elastically deformable polymer material. The hose 10 is e.g. manufactured by extrusion. Due to manufacturing variations and/or deformations of the hose 10 during the use thereof, the dimensions of the hose 10, namely the internal diameter d10, the external diameter D10 and the thickness E10, vary e.g. by ±10%.

We will now describe the female element 100 of the quick-coupling R.

The female element 100 comprises a body 102, which has an overall shape of revolution about a longitudinal axis A100. In the configuration shown in FIG. 1, the longitudinal axis A100 is aligned with the hose axis A10 and the aligned axes together define a fitting axis of the coupling R.

The body 102 is herein made in two parts and comprises a proximal part 104, wherein a tapped hole 105 is provided for fastening a fluid duct therein, and a distal part 106, which is herein assembled to the proximal part 104 by screwing. The fluid duct is not shown. The tapped hole 105 defines a rear side of the body 102 and, by extension, a rear side of the female element 100. A front side is a side opposite the rear side. The body 102 of the female element 100 is hollow and delimits a fluidic passage V100. The fluidic passage V100 emerges herein, on the rear side, through the tapped hole 105.

In general, it is specified that for a given first axis, an axis radial to the first axis is an axis orthogonal to the first axis. A plane transverse to the first axis is a plane orthogonal to the first axis. An axis orthoradial to the first axis is an axis which is supported by a plane transverse to the first axis and which is not secant to the first axis.

The female element 100 further comprises a nipple 120. The nipple 120 is rigidly attached to the body 102. In the example illustrated, the nipple 120 is assembled by screwing to the proximal part 104. The nipple 120 comprises a base 122, by means of which the nipple 120 is assembled to the proximal part 104, and a front portion 124, which has an elongated shape and which extends parallel to the longitudinal axis A100 and which is configured for being fitted into the hose 10.

The base 122 provides an abutment surface 125, which is oriented forwards and from which the front portion 124 extends. The abutment surface 125 is located in a plane transverse to the longitudinal axis A100. When the hose 10 is fitted onto the front portion 124, the abutment surface 125 limits the amplitude of the movement of the hose 10 rearwards of the female element 100, parallel to the longitudinal axis A100.

The distal part 106 herein forms a mounting volume V106 which houses a sub-assembly comprising the nipple 120 and the proximal part 104. In the example illustrated, the distal part 106 comprises a shoulder 108 which is provided in the mounting volume V106 and which is oriented rearwards, the abutment surface 125 abutting against the shoulder 108. The shoulder 108 is thus aligned, along the longitudinal axis A100, with the abutment surface 125.

On the front side of the abutment surface 125, the distal part 106 comprises a protrusion 110, which has a shape of revolution about the longitudinal axis A100, which extends forwards at a distance from the nipple 120 and which provides a receiving volume V110 for the hose 10. The receiving volume V110 is configured for receiving the hose 10 when the hose 10 is fitted onto the nipple 120. The reception volume V110 has a shape of revolution about the longitudinal axis A100, being delimited on the rear side by the abutment surface 125 and emerging from the body 102, forwards, by a mouth 126. The mouth 126 is preferentially circular and has a diameter greater than the external diameter D10 of the hose 10.

The nipple 120 has a shape of revolution about the axis A100 and provides a channel V120. The channel V120 is thus centered on the axis A100. The nipple 120 is fluidically connected to the proximal part 104. The channel V120 emerges on the front side of the female element 100 and into the passage V100.

The nipple 120 comprises an external surface which extends into the receiving volume V110. The external surface of the nipple 120 is configured for being pressed into the hose 10. The internal surface 12A of the hose 10 is received on the external surface of the nipple when the hose 10 is pressed onto the nipple 120. The external surface of the nipple is configured for receiving the internal surface 12A of the pipe in that the end of the front portion 124 of the nipple 120 has a diameter close to or less than the internal diameter d10 of the hose 10.

A circumferential bulge 128 is advantageously provided protruding from the front portion 124 of the nipple 120. The circumferential bulge 128 is configured for cooperating with the internal surface 12A of the hose 10, so as to improve the sealing between the hose 10 and the nipple 120 and to retain the internal surface 12A of the hose fitted onto the nipple 120. In the first embodiment, the circumferential bulge 128 is arranged at a front end of the front portion 124 of the nipple 120. The circumferential bulge 128 comprises, successively starting from the mouth of the nipple 120 and moving rearwards, a distal portion 129A which diverges rearwards from the female element 100 and which is configured for facilitating the fitting of the nipple 120 into the hose 10, and a proximal portion 129B, which diverges towards the front of the female element 100. On the rear side, the proximal portion 129B is delimited by a first clamping plane P129 which is a plane transverse to the longitudinal axis A100.

When the hose 10 is pressed onto the nipple 120, the hose 10 deforms elastically and accommodates the passage of the circumferential bulge 128. It is considered that the internal surface 12A of the hose 10 matches the external surface of the nipple 10, in particular matches the profile of the bulge 128 by elastic deformation so as to produce a sealing section between the hose 10 and the nipple 120.

The body 102 further comprises at least one radial opening 130. In the example illustrated, the body 102 comprises two radial openings 130 which are formed through the protrusion 110. Each radial opening 130 is provided in the body 102 along a respective guide axis A130. Each guide axis A130 is radial to the longitudinal axis A100. Each radial opening 130 emerges into the receiving volume V110. The two radial openings 130 are herein diametrically opposite each other with respect to the longitudinal axis A100, which means that the two guide axes A130 are aligned. The guide axes A130 are situated in a longitudinal plane P100 of the female element 100, the longitudinal plane P100 being the sectional plane of FIG. 1.

In the example illustrated, each radial opening 130 has, in a plane orthogonal to the corresponding guide axis A130, an overall rectangular cross-section.

Each radial opening 130 thus comprises two transverse walls 132A which extend opposite each other orthogonally to the longitudinal axis A100, and two lateral walls 132B which extend opposite each other parallel to the longitudinal axis A100. The transverse walls 132A and the lateral walls 132B are parallel to the corresponding guide axis A130. In other words, each radial opening 130 has walls 132A and 132B which are parallel to the corresponding guide axis A130.

Advantageously, clearances 134 are provided perpendicularly to the two side walls 132B. The clearances 134 are here made by milling and each have a semi-cylindrical shape, the clearances 134 being centered on an axis orthoradial onto the longitudinal axis A100.

Optionally, fillets 136 are provided at each of the junctions between the lateral walls 132B and the clearances 134. The fillets 136 are here rounded machinings, provided by drillings parallel to the corresponding guide axis A130.

Each radial opening 130 receives a lock 140, each lock 140 being movable in translation with respect to the body 102 of the female element 100 along a direction parallel to the guide axis A130 of the radial opening 130 wherein the lock 140 is received.

Advantageously, the body 102 comprises a first view port 138 which extends through the body 102 along a sighting axis A138 radial to the longitudinal axis A100. The first port 138 here has a cylindrical shape with a substantially rectangular section, the first port 138 being arranged along the length thereof transversely to the longitudinal axis A100. The first port 138 is provided at the front of the abutment surface 125. The first port 138 emerges into the reception volume V110. The first port 138 emerges outside the body 102. The first port 138 is arranged so as to let a part of the abutment surface 125 be observed through the first port 138.

In the example illustrated, the body 102 comprises two first ports 138 which are provided between each of the radial openings 130 and the abutment surface 125, the sighting axes A138 being parallel to the guide axes A130.

Figure 2:
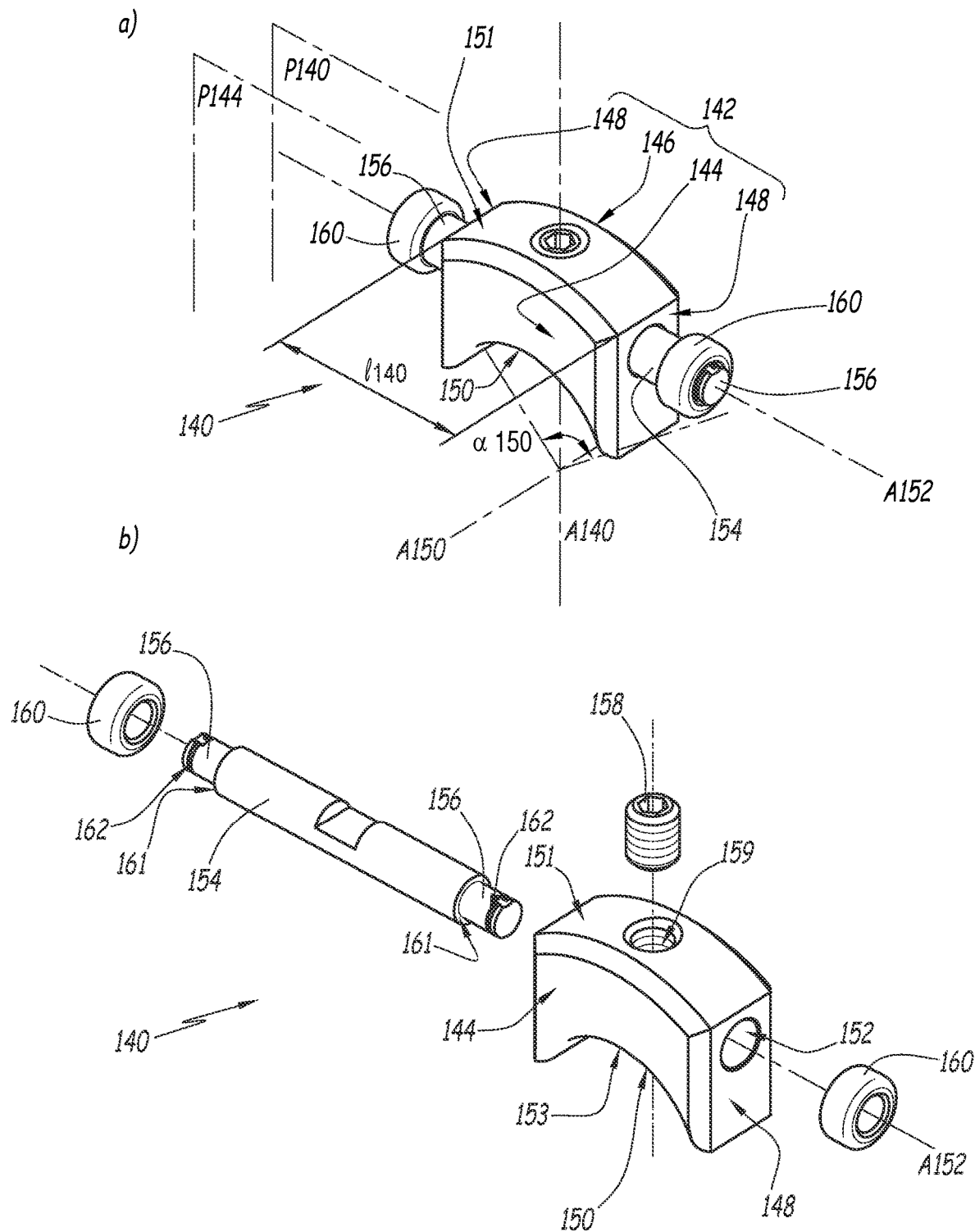
FIG. 2 shows, on two inserts a) and b), a lock belonging to the female element shown in FIG. 1, represented in perspective and in an exploded perspective, respectively.
Figure 3:
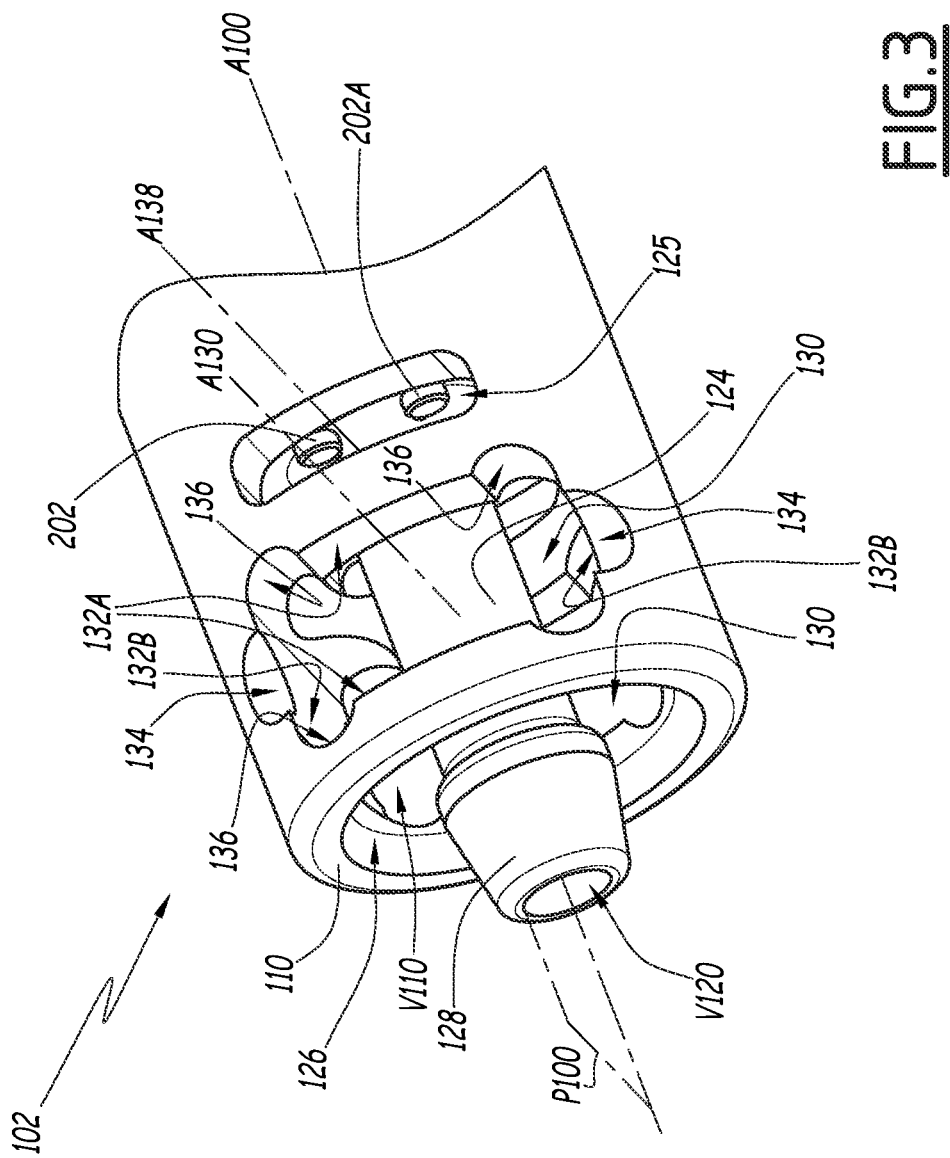
FIG. 3 is a partial perspective view of a body of the female element shown in FIG. 1, seen along an arrow III in FIG. 1.

A lock 140 is shown alone in FIG. 2.

The locks 140 will now be described with reference in particular to FIG. 2. The two locks 140 of the female element 102 are preferentially identical to each other.

Each lock 140 has a peripheral surface 142 centered on a lock axis A140. When a lock 140 is received in one of the radial openings 130, the lock axis A140 of this lock coincides with the radial axis A130 of the corresponding radial opening 130. The peripheral surface 142 is configured for cooperating with the transverse walls 132A and the lateral walls 132B of the radial opening 130, in particular by matching shapes, so as to guide the lock 140, received in the corresponding radial opening 130, in translation along the coincident axes A130 and A140.

In the example, the peripheral surface 142 has a rectangular profile in cross-section in a plane orthogonal to the lock axis A140. The peripheral surface 142 comprises a distal face 144 which is oriented towards the mouth 126 when the lock 140 is received in the corresponding radial opening 130, a proximal face 146, which is oriented opposite the distal face 144 and thus oriented on the opposite side of the mouth 126, the distal face 144 and the proximal face 146 being connected to each other by two lateral faces 148. The distal 144, the proximal 146 and the lateral 148 faces are preferentially plane. The distal face 144 is geometrically supported by a second clamping plane P144 which is a plane transverse to the longitudinal axis A100 when the female element 100 is assembled.

In the mounted configuration of the lock 140 in a radial opening 130, the distal 144 and proximal 146 faces are in sliding contact with the transverse walls 132A of the opening, whereas the lateral faces 148 are in sliding contact with the lateral walls 132B of the opening.

Each lock 140 further comprises an internal surface 150 which is herein an overall concave surface crossed by the corresponding lock axis A140. The internal surface 150 is oriented towards the longitudinal axis A100 opposite the external surface of the nipple 120 when the lock 140 is received in the associated radial opening 130. Each lock 140 further comprises an external face 151, which is oriented away from the internal face 150 along the lock axis A140.

As explained hereinbelow, each internal surface 150 is configured for abutting onto the external surface 12B of the hose 10 when the hose 10 is pressed onto the nipple 120, so as to clamp the hose 10 and prevent same from sliding on the nipple 120. Each internal surface 150 is thus a clamping surface of the corresponding lock 140.

For convenience, a median plane P140 of the lock 140 is defined as being a plane parallel to the distal face 144 and containing the lock axis A140. The median plane P140 is herein a plane of symmetry of the lock 140. In the example illustrated, each internal surface 150 is a portion of a cylinder of circular cross-section and centered on an axis A150 orthogonal to the median plane P140. The internal surface 150 has a diameter substantially equal to the diameter of the mouth 126.

The internal surface 150 has, in projection on the median plane P140, a profile in the form of an arc of a circle centered on the axis A150. A clamping angle α150 is defined as being the angle of said arc of a circle measured around the axis A150 on which the arc of a circle is centered. The clamping angle α150 is as large as possible, so as to increase a contact surface area between each lock 140 and the hose 10. Thereby, the clamping angle α150 is greater than or equal to 90°, preferentially greater than or equal to 120°, more preferentially greater than or equal to 160°. In the example illustrated, the clamping angle α150 is equal to 160°.

In FIG. 1, the locks 140 are shown in section. For each lock 140, the internal face 150 is connected to the corresponding distal 144 and proximal 146 faces by two respective rounded edges 153, so as to reduce the risks of marking the hose 10 when the latter is held by the locks 140, as explained thereafter.

A through bore 152 is provided through each lock 140, the bore 152 jutting onto each of the lateral faces 148 of the lock. The bore 152 is centered on an axis A152 which is parallel to the median plane P140 and orthogonal to the locking axis A140. In other words, in the assembled configuration of the female element 100, the axis A152 of the bore 152 is orthoradial to the longitudinal axis A100.

Each lock 140 comprises a rod 154 which is received in the corresponding bore 152 and which protrudes from each of the lateral faces 148, so as to form two guide pins 156. The rod 154 is herein held in the bore 152 by means of a pressure screw 158 inserted in a tapping 159 which emerges onto the external face 151. When the female element 100 is assembled, the pins 156 of each lock 150 thereby extend along the direction of the axis A152 of the bore 152, in other words along a direction orthogonal to the radial axis A130 of the corresponding radial opening 130.

A width E140 of each lock 140 is defined as being a distance between the two lateral faces 148 of the lock 140. In other words, the width ϴ140 is substantially equal, within the assembly tolerances, to a distance between the two lateral surfaces 132B of a radial opening 130. The width ϴ140 is greater than 50% of the diameter of the mouth 126—in other words greater than a radius of the mouth 126 —, preferentially greater than 75% of the diameter of the mouth 126, more preferentially greater than the diameter of the mouth 126. Thereby, a contact surface as extensive as possible is provided between each lock 140 and the hose 10.

In the first embodiment, each lock 140 advantageously comprises rollers 160, each of which is assembled with a respective pin 156. The rollers 160 are advantageously mounted movable in rotation with respect to the rod 154 about the axis A152. In the example, the axial movements of each roller 160 are limited by a shoulder 161 provided on the rod 154 and by an elastic ring housed in a groove 162 provided at the end of the rod 154. The rings are not shown. Advantageously, the rollers are made of a material that reduces friction during metal-to-metal contact. The rollers 160 are preferentially made of a copper alloy, preferentially bronze. The rollers 160 serve for improving the operation of the female element 100, as explained thereafter.

Each lock 140 is received in a respective radial opening 130 and is movable in translation with respect to the body 102 of the female element 100 along the corresponding radial axis A130, between a first position, wherein the lock 140 penetrates into the receiving volume V100, and a second position, wherein the lock 140 does not penetrate into the receiving volume V100.

Figure 4:
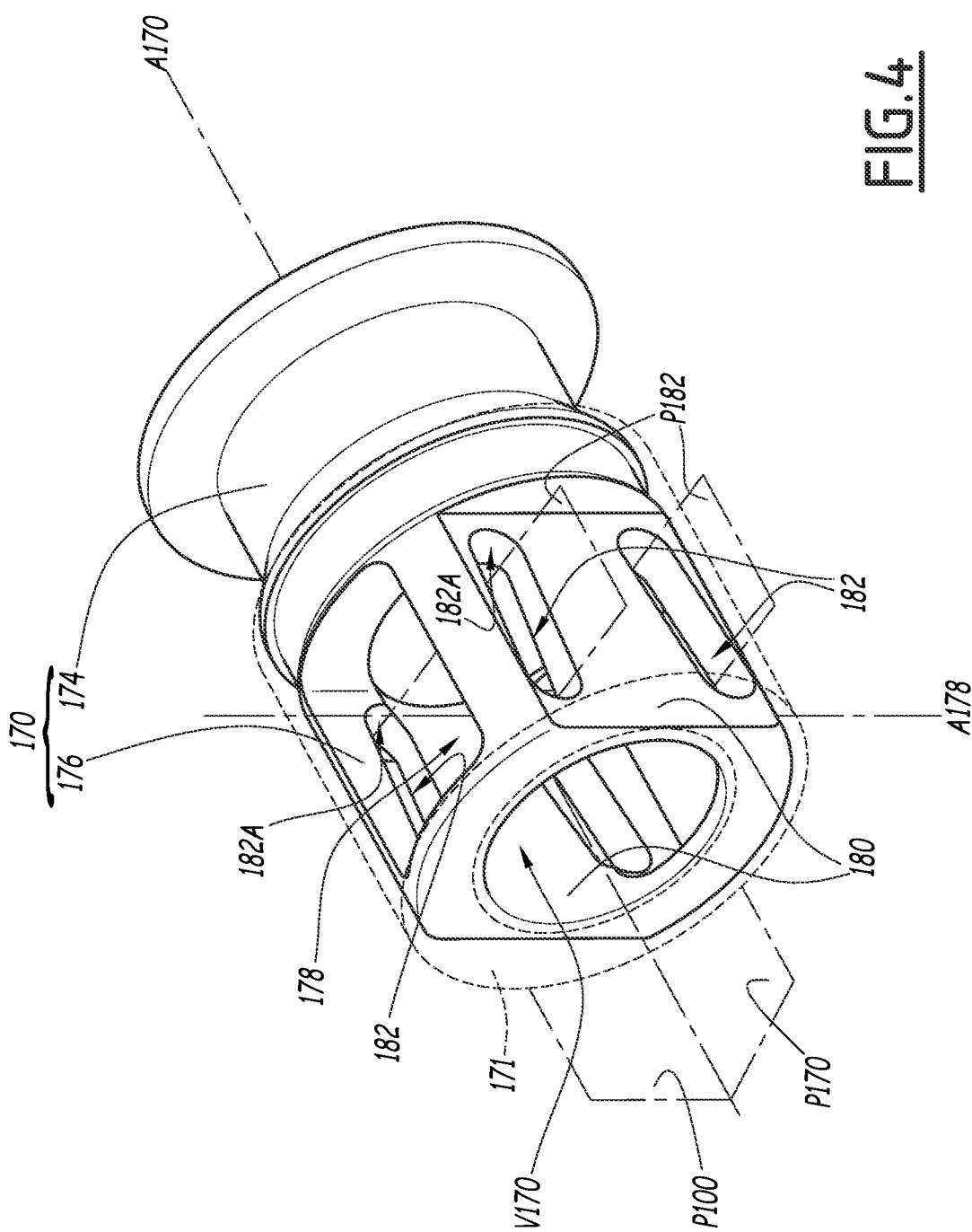
FIG. 4 is a perspective view of an operating ring of the female element shown in FIG. 1, seen along the arrow IV shown in FIG. 1.

The movements of each of the locks 140 are controlled by an operating ring 170 which belongs to the female element 100. An operating ring 170 is shown alone in FIG. 4. The female element 100 advantageously comprises a transparent portion, herein a cover 171, which has an overall cylindrical shape and which is assembled onto the operating ring 170, e.g. clipped to the operating ring 170 or else overmolded onto the operating ring 170. The cover 171, which is advantageously made of a transparent material, is shown in dotted lines in FIG. 4. The cover 171 serves in particular for preventing the ingress of foreign bodies into the female element 100, while allowing a visual inspection of the female element 100.

The cover 171 is optional, since same is not essential for the functioning of the female element 100 but contributes to the safety of use of the female element 100.

The operating ring 170 has an overall shape of revolution about a ring axis A170 and provides a cavity V170 configured for receiving the body 102. In the assembled configuration of the female element 100, the operating ring 170 is arranged around the body 102 coaxially with the longitudinal axis A100, i.e. the ring axis A170 coincides with the longitudinal axis A100. The longitudinal plane P100 of the female element 100 is also a longitudinal plane for the operating ring 170. The operating ring 170 has herein a symmetrical shape both with respect to the longitudinal plane P100 and with respect to a second plane P170, the second plane P170 being parallel to the ring axis A170 and orthogonal to the longitudinal plane P100.

Thereby, the cavity V170 emerges both on a front side of the operating ring 170 and on a rear side of the operating ring 170, the front and rear sides of the operating ring 170 being identical to the front and rear sides of the female element 100 when the female element 100 is assembled.

The operating ring 170 is movable in translation with respect to the body 102 of the female element 100 along the longitudinal axis A100, between a front position and a rear position. Herein, the operating ring 170 is returned by default towards the front of the female element 100 by a first return member, herein a compression spring 172, which acts between two opposite faces of the operating ring 170 and of the body 102.

The operating ring 170 herein comprises a rear portion 174, which slides around the body 102 and which houses the spring 172, and a front portion 176, wherein a radial passage 178 is provided. The radial passage 178 crosses right through the front portion 176 parallel to a passage axis A178, which is an axis radial to the ring axis A170 and parallel to the longitudinal plane P100. The passage axis A178 is thus parallel to the guide axes A130 when the female element 100 is assembled. The radial passage 178 has herein the shape of a cylinder with a substantially rectangular profile and centered on the axis of passage A178.

The radial passage 178 is configured for receiving the locks 140, without interfering with the movements of the locks when the operating ring 170 is moved between the front position thereof and the rear position thereof, and when the locks 140 are moved between the respective first position thereof and the second position thereof.

The radial passage 178 provides two plane walls 180 which are arranged opposite each other on either side of the longitudinal plane P100. Each plane wall 180 comprises two guide grooves 182, each associated with a respective lock 140.

The guide grooves 182 are herein oblong holes, each of which extends parallel to the longitudinal plane P100 and which open into the radial passage 178.

For each lock 140, the operating ring 170 thereby comprises two guide grooves 182, the two grooves 182 being parallel to each other and situated on both sides of the longitudinal plane P100.

Figure 5:
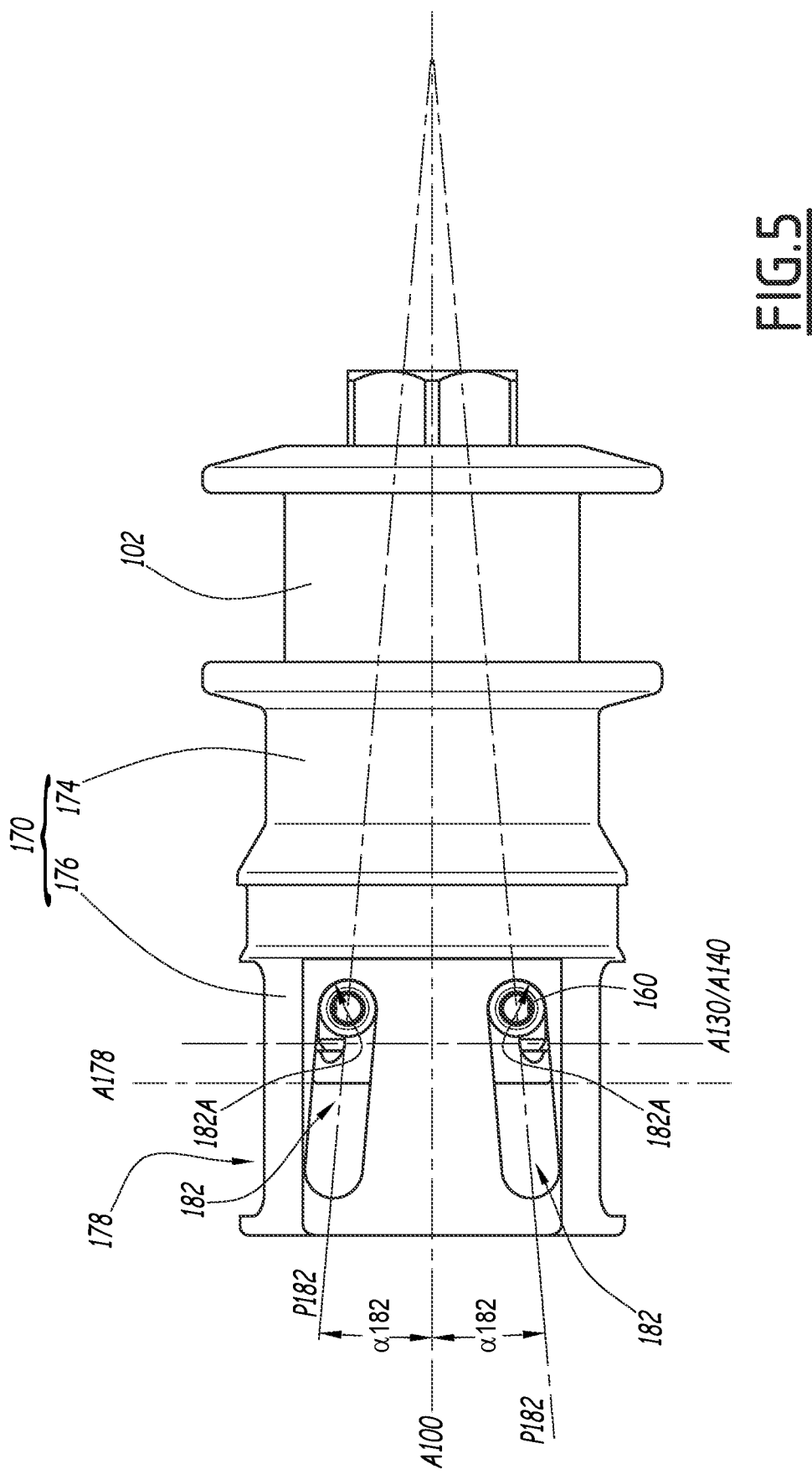
FIG. 5 is a side view of the female element shown FIG. 1, some parts being hidden.

The guide grooves 182 associated with the same lock 140 are geometrically supported by a guide plane P182. The guide plane P182 and the ring axis A170—and by extension the longitudinal axis A100—form therebetween, an angle of inclination α182 which, by convention, is considered to be equal to 90°—degrees—when the guide plane P182 is orthogonal to the longitudinal axis A100, and as being equal to 0° when the guide plane P182 is parallel to the longitudinal axis A100. The inclination angle α182 is shown in FIG. 5.

Each guide plane P182 is inclined with respect to the longitudinal axis A100. Inclined means that the guide plane P182 is neither parallel nor orthogonal to the longitudinal axis A100. In other words, the angle of inclination α182 is neither zero nor equal to 90°.

Herein, each guide plane P182 is inclined rearwards, i.e. the guide grooves 182 come closer to the longitudinal axis A100 as same come closer to the rear of the female element 100 when the female element 100 is assembled.

When the female element 100 is assembled, each lock 140 is received in a respective radial opening 130 and in the respective radial passage 178 and is guided in translation along the guide axis A130. The axes 156, herein equipped with rollers 160, are received in the guide grooves 182 which are inclined. Thereby, when the operating ring 170 is moved towards the front of the female element 100, each lock 140 is brought closer to the longitudinal axis A100, until the rollers 160 come into abutment against a bottom 182A of the corresponding guide groove 182. Herein, the front position of the operating ring 170 is thus a position for locking the operating ring 170, the compression spring 172 being arranged for pushing the operating ring 170 towards the locking position thereof. The axial position of the rollers 160 along the axis A100 determines the stop forwards of the operating ring 170. In a variant, an alternative stop means could be provided for stopping the operating ring in translation on the front against the force of the spring 172.

On the other hand, when the operating ring 170 is moved towards the rear of the female element 100, each lock 140 is moved away from the longitudinal axis A100 by the rollers 160 which slide in the guide grooves 182. Herein, the rear position of the operating ring 170 is thus an unlocking position of the operating ring 170.

It will be understood that the transmission of forces between the operating ring 170 and the locks 140 depends on the angle of inclination α182. The angle of inclination α182 and the mechanical characteristics of the spring 172, in particular a stiffness and a length of the spring 172, are chosen so as to provide the retaining of the hose 10 while allowing a manual locking/unlocking operation of the female element 100. Each guide plane P182 is inclined with respect to the longitudinal axis A100 by an angle of inclination α182 comprised between 2° and 30°, preferentially comprised between 5° and 10°, more preferentially equal to 5°. In the example illustrated, the inclination angle α182 is equal to 5°.

In the first embodiment, the distal portion 129A has a frustoconical shape, whereas the proximal portion 129B which connects the distal portion 129A to the remainder of the front portion 124, is oriented towards the locks 140, so as to pinch the tube 10 between the proximal portion 129B and the locks 140 when the tube 10 is pressed onto the nipple 120 and the locks 140 held in the first position. The first clamping plane P129 is situated in front of the second clamping plane P144. The first clamping plane P129 and the second clamping plane P144 are advantageously brought closer together so as to pinch the hose 10, with an axial pinching component through the radial action of the lock 140. Thereby, the first clamping plane P129 and the second clamping plane P144 are separated by an interval I100, measured parallel to the longitudinal axis A100, of less than 5 mm, preferentially less than 2 mm. Advantageously, the first clamping plane P129 is kept at a distance from the abutment surface 125, e.g. P129 and the surface 124 are separated by an interval of 2 cm measured parallel to the longitudinal axis A100, in such a way that the external surface portion 12B of the hose, which can be permanently pinched on a separate nipple by a clamping collar (not shown) is distinct from the external surface portion 12B of the hose, which is temporarily pinched by the locks 140 of the female element 100.

A portion of an external surface of the nipple 120 which extends opposite the internal clamping surface 150 of each lock 140 is called the clamping portion 129C. The clamping portion 129C is thus situated herein at the rear of the proximal portion 129B of the circumferential bulge 128 and has the shape of a cylinder with a circular section and centered on the longitudinal axis A100. The clamping portion 129C and the internal surface 150 of each lock 140 delimit therebetween an annular clamping space V129 which houses the hose 10 fitted onto the nipple 120. Each lock 140 thereby applies a force to a large retaining surface of the hose 10, which contributes to the holding of the hose 10 and prevents the hose 10 from being marked.

Advantageously, the female element 100 further comprises a valve 190, which in this case is partially received in the passage V100 and which is movable with respect to the body 102 between a forward position, wherein the valve closes the passage V100, and a retracted position, wherein the valve does not close the passage. The forward position is thus a closing position, whereas the retracted position is an opening position. The valve 190 is shown in the forward position in FIGS. 1 and 6, and in the retracted position in FIGS. 7 and 8.

In the example illustrated, the valve 190 comprises a main body 192 of cylindrical shape centered on the longitudinal axis A100, and a collar 194, which is provided protruding from the main body 192 radially to the longitudinal axis A100. The collar 194 is herein received in a cavity V122 provided by the base 122 of the nipple 120. The collar 194 is configured for abutting against a wall 195 of the body 102, the wall 195 forming a seat, when the valve 190 is in the forward position. The valve 190 further comprises a second return member, herein a valve spring 196, which returns the valve 190 towards the forward closing position thereof. In the example shown, the valve spring 196 is received in the cavity V122 and pushes the collar 194 forward.

The valve 190 comprises seals 198, which herein are annular seals housed in grooves provided on a rear part of the main body 192 and which provide the sealing of the valve 190 in the forward position.

The movements of the valve 190 are controlled by the hose 10 when the hose 10 is fitted onto the nipple 120. More precisely, the valve 190 is configured for changing from the forward position thereof to the retracted position thereof when a hose 10 is fitted onto the nipple 120 and abuts against the abutment surface 125.

In the example illustrated, the body 102 has housings, herein bores 200, which are provided through the base 122 parallel to the longitudinal axis A100 and which each emerge onto the abutment surface 125 and into the cavity V122 of the base 122, opposite the collar 194. There are herein five bores 200, regularly distributed, diametrically staggered, around the longitudinal axis A100.

Each of the bores 200 receives a respective control finger 202, each control finger 202 having an elongated shape and comprising a front portion 202A and a rear portion 202B opposite the front portion 202A. Each finger 202 is movable in translation in a bore 200, with respect to the body 102, parallel to the longitudinal axis A100, between a jutting position, wherein the front portion 202A of the control finger 202 raises from the abutment surface 125, and a retracted position, wherein the front portion 202A does not raise from the abutment surface 125. For each control finger 202, when the finger 202 is in the jutting position thereof, the rear portion 202B does not jut into the cavity V122, whereas in the retracted position of the finger, the rear portion 202B of the finger 202 does jut into the cavity V122. The collar 194 armed by the valve spring 196, thereby tends to push the control fingers 202 towards the jutting position thereof. The bores 200 are arranged so that the front portion 202A of each control finger 202 is accessible to the front face 14 of the hose 10 when the hose is fitted onto the nipple 120 and is brought close to the abutment surface 125.

It will be understood that when the hose 10 is fitted onto the nipple 120 and abuts against the abutment surface 125, the end of the hose 10 pushes the control fingers 202 from the jutting position thereof towards the retracted position thereof, also pushing the collar 194, and hence the valve 190 from the forward position thereof to the retracted position thereof.

More generally, the control fingers 202 are an example of an embodiment of a control member which is configured for pushing the valve 190 from the forward position thereof to the retracted position thereof when the hose 10 is fitted onto the nipple 120 and moves the front portion 202A of the control member from the jutting position thereof to the retracted position thereof.

The operation of the female element 100 and of the coupling R will now be described with reference to FIGS. 1 6 to 8.

In FIG. 1, the coupling is in the uncoupled configuration. The compression spring 172 pushes the operating ring 170 back into the locking position, which keeps the locks 140 in the first position thereof in the receiving volume 126. Each roller 160 is in abutment at the bottom of the respective guide groove 182, on the rear side of the operating ring 170.

The valve spring 196 pushes the valve 190 back into the forward closing position thereof, while the collar 194 pushes the control fingers 202 back into the jutting position thereof.

Each first port 138 is arranged so as to make possible the observation, along the corresponding sighting axis A138, of the front portions 202A of the control fingers 202 as long as the front portions 202A jut out from the abutment surface 125. In other words, each first port 138 let the control members 202 to be observed in the jutting position.

Advantageously, the radial passage 178 coincides with the first ports 138, when the operating ring is in the locking position, so as to make possible the observation, through the first port, of the front portion 202A of the control fingers 202 as long as the front portion 202A is jutting out from the abutment surface 125. In particular, the cover 171 which covers the first port 138 and the second port 178 and which is transparent, does not hinder the observation through the radial passage 178 along the sighting axis A138.

To couple the hose 10 and the female element 100, the hose axis A10 is aligned with the longitudinal axis A100 of the female element 100 so as to form together the fitting axis of the coupling R. The hose 10 is arranged in front of the mouth 126 and is fitted onto the nipple 120 in a fitting movement. The fitting movement of the hose 10 is a translational movement of the hose 10 with respect to the female element 100, parallel to the fitting axis of the coupling R, the front face 14 of the hose 10 being brought close to the abutment face 125. At the same time, an operator moves the operating ring 170 to the unlocking position thereof, which drives the locks 140 from the first position thereof to the second position thereof, thereby freeing the access to the mouth 126 of the receiving volume V110.

While maintaining the operating ring 170 in the unlocking position thereof, the operator continues the movement of fitting the hose 10 onto the nipple 120, the hose 10 accommodating, by elastic deformation, the passage of the circumferential bulge 128. While the fitting movement continues, the front face 14 of the hose 10 abuts against the control fingers 202. Such second configuration of the coupling R is shown in FIG. 6.

Advantageously, the radial passage 178 coincides with the first ports 138, when the operating ring is in unlocking position, so as to make possible the observation, through the first 138 port of the front portion 202A of the control fingers 202 as long as the front portion 202A is jutting out from the abutment surface 125. Thereby, the radial passage 178 is an example of a second port, which coincides with each first port 138, when the operating ring 170 is in the unlocking position, so as to allow the control fingers 202 to be observed through each first port 138 in the jutting out position. The cover 171 also makes it possible to observe the position of each roller 160 in the respective guide groove 182 thereof.

Figure 6:
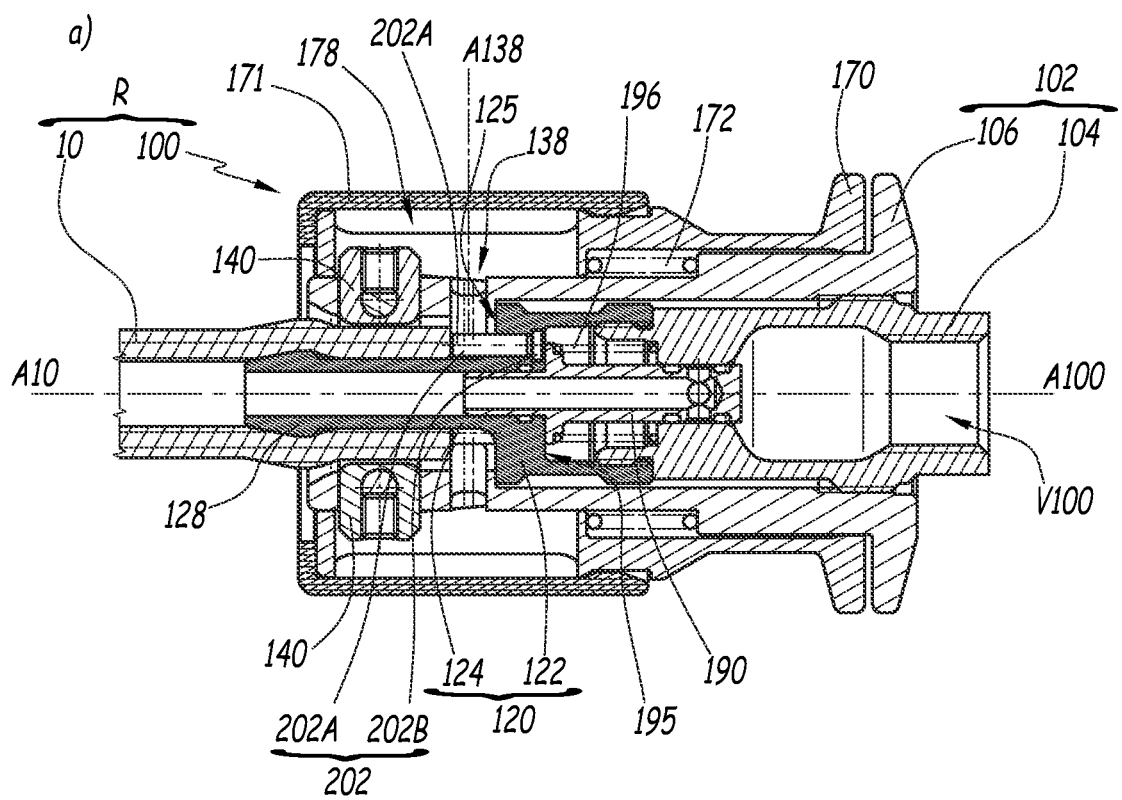
FIG. 6 shows, on two inserts a) and b), the quick-coupling shown in FIG. 1 in a second configuration, the quick-coupling being shown respectively in longitudinal section and in side view, some parts being hidden.
Figure 6:
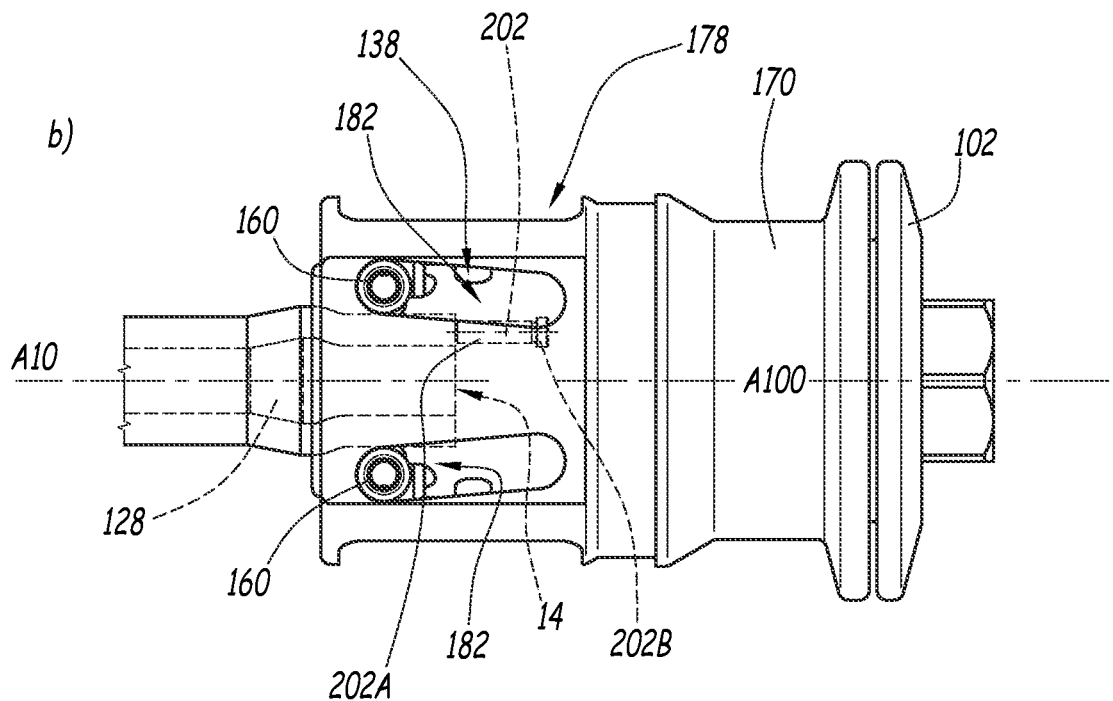

Starting from the second configuration shown in FIG. 6, whereas the movement of fitting the hose 10 onto the nipple continues, the front face 14 of the hose 10 comes closer to the abutment face 125, pushing the control fingers 202 back from the jutting out position thereof to the retracted position thereof, which pushes the valve 190 back from forward position thereof to the retracted position thereof. The coupling R then arrives at a third configuration thereof, shown in FIG. 7. In other words, the fitting movement of the hose 10 leads to the opening of the valve 190. The presence and the position of the hose 10 can be seen through the first port 138, the radial passage 178 and the cover 171, so that the operator can ensure that the coupling configuration of the connection is satisfactory.

The operating ring 170 is held in the unlocking position thereof throughout the fitting movement. The fitting movement continues until the hose 10 comes into abutment against the abutment surface 125. The coupling R is then in the configuration shown in FIG. 7. The valve 190 is in the retracted opening position.

Figure 7:
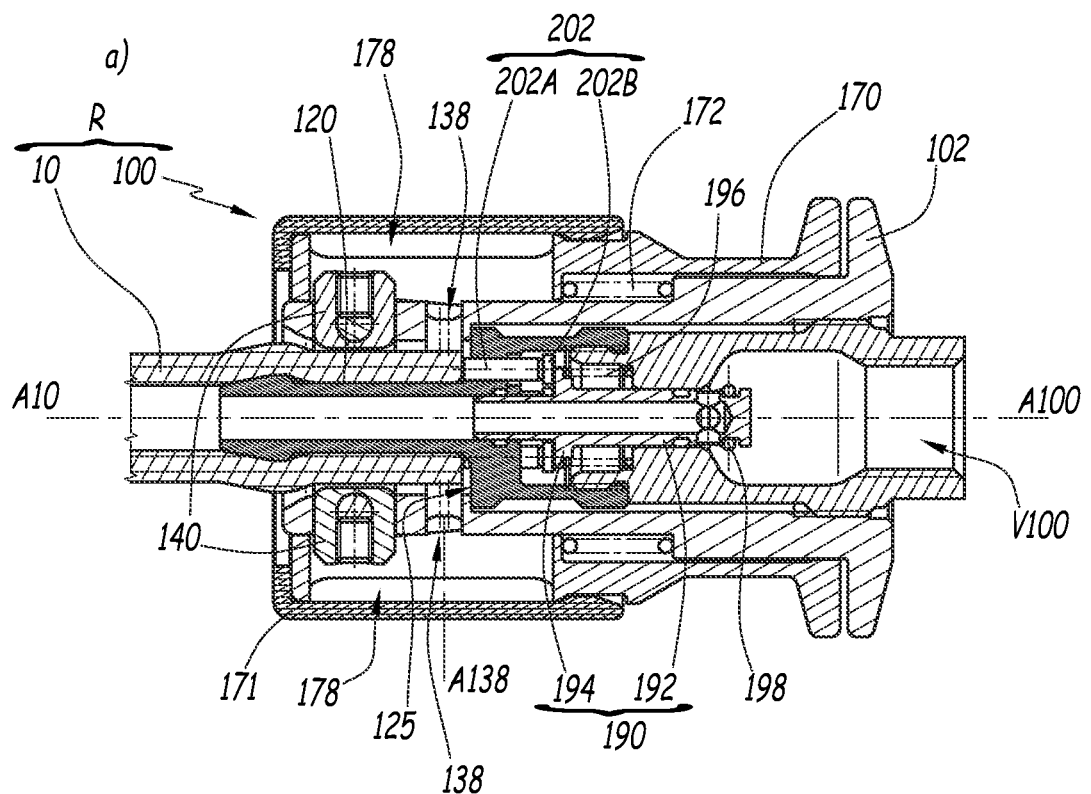
FIG. 7 shows, on two inserts a) and b), the quick-coupling shown in FIG. 1, in a third configuration, the quick-coupling being shown in longitudinal section and in side view, respectively, some parts being hidden.
Figure 7:
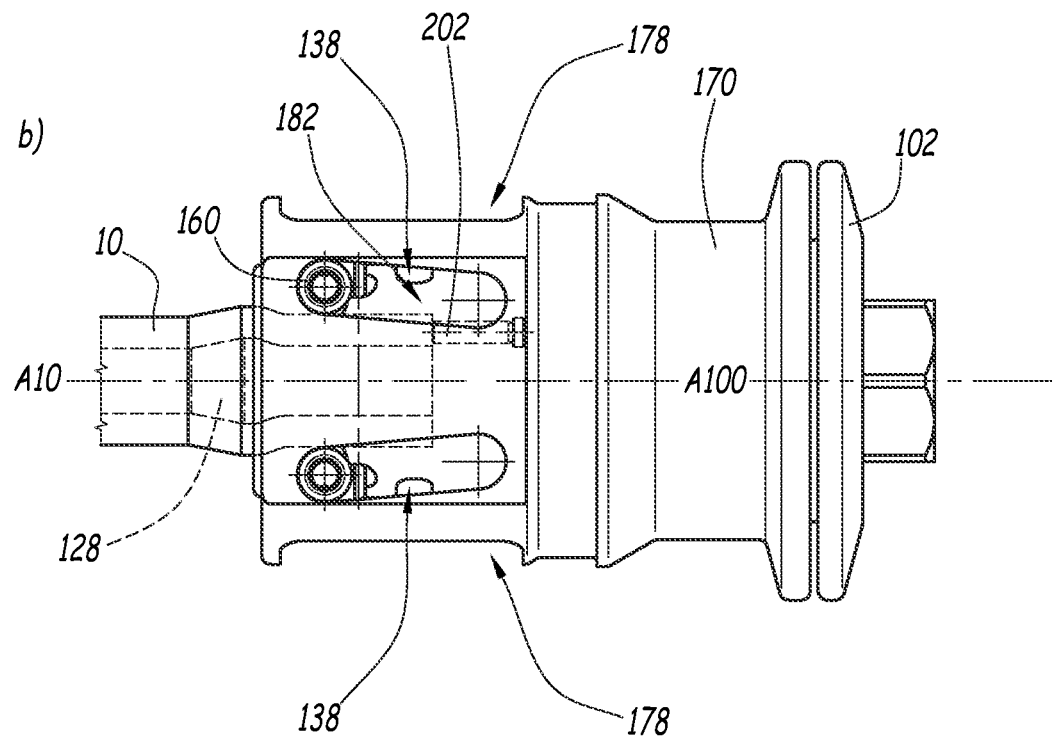
Figure 8:
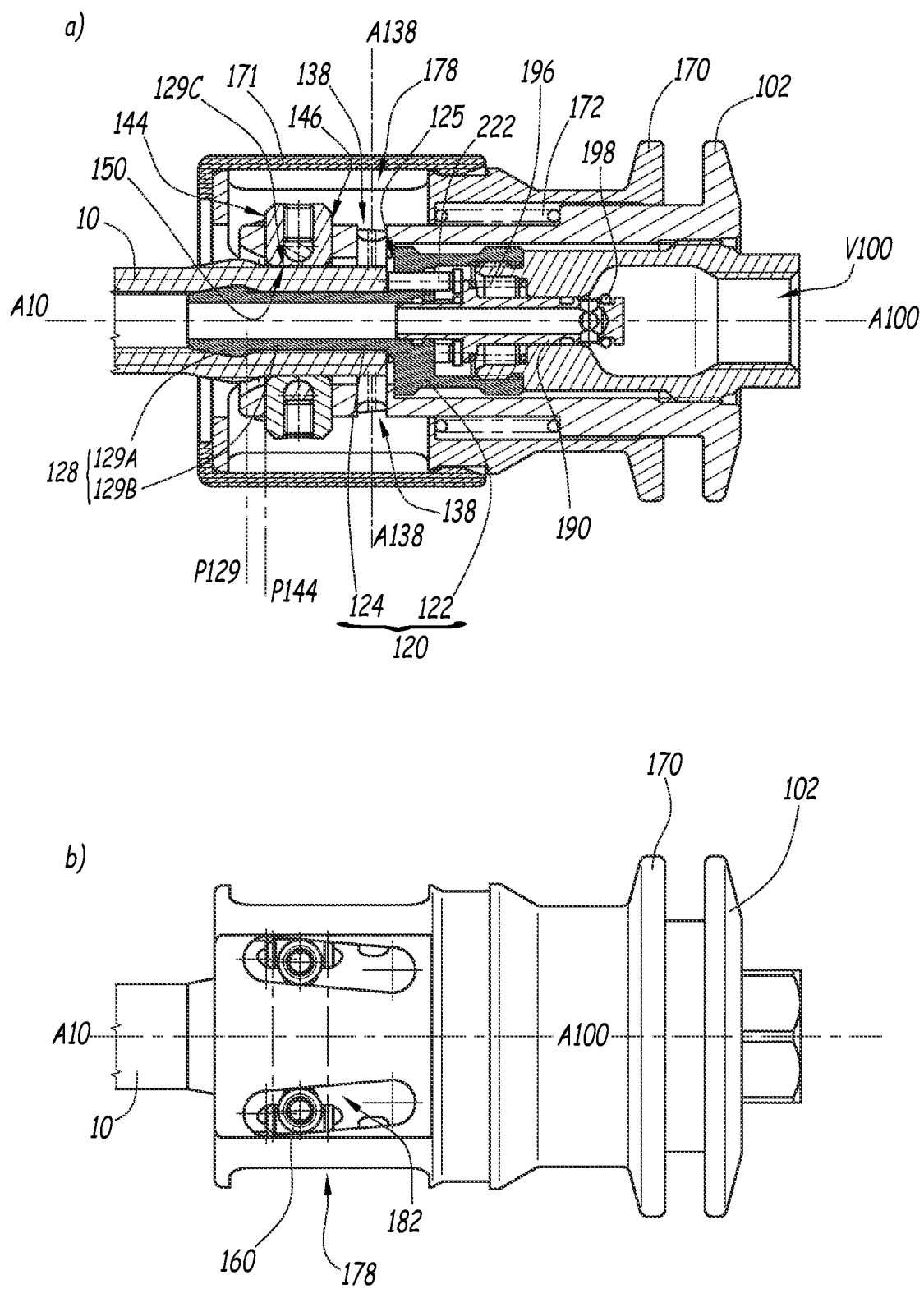
FIG. 8 shows, on two inserts a) and b), the quick-coupling shown in FIG. 1, in a fourth so-called coupled configuration, the quick-coupling being shown in longitudinal section and in side view, respectively, some parts being hidden.

From the third configuration shown in FIG. 7, if the operator releases the operating ring 170, the compression spring 172 pushes the operating ring 170 back towards the locking position thereof, which drives each lock 140 from second position thereof towards the first position thereof. During such movement, the internal surfaces 150 of the locks 140 come into contact with the hose 10 and press the hose 10 radially against the nipple 120. The position of each lock 10 is determined by the balance between a force exerted by the locks 140 on the hose 10 and an elastic return force of the hose 10 pinched in this way. The coupling R is then in a fourth coupled configuration, shown in FIG. 8. Due to the radial action of the locks 140 and to the friction of the hose 10 on the nipple 120, it is not possible to uncouple the coupling R simply by pulling on the hose 10. The coupling of the R connection is thereby secured.

In the coupled configuration, the rollers 160 do not abut against one of the ends of the corresponding guide groove 182 but are in an intermediate position in the respective guide groove 182 thereof. It will be understood that the coupling R offers a secure coupling by accommodating the variations in thickness E10 of the hose 10.

From the coupled configuration, if the operator wishes to uncouple the coupling R, the operator has first to move the operating ring 170 to unlocking position thereof, herein rearwards. Such operation is equivalent to FIG. 6 representing the second configuration at the coupling. In doing so, the operator moves the locks 140 towards the second position thereof. Since the hose 10 is no longer held by the locks 140, the operator can pull out the hose 10 in a movement the reverse of the fitting movement. During such reverse movement, the operator checks, through the first port 138, the radial passage 178 and the cover 171, that the front portions 202A are jutting out from the abutment surface 125, which indicates that the valve 190 changes from the retracted opening position thereof to the forward closed position thereof.

Once the nipple 120 has been completely pulled out from the hose 10, the operator can release the operating ring 170 and let the operating ring 170 return to the locking position thereof. The coupling R is then back to the first uncoupled configuration shown in FIG. 1.

Other embodiments of the invention will now be described. In the other embodiments, the elements similar to the element of the embodiment or the embodiments described hereinabove have the same references and operate in the same way. Hereinafter, mainly the differences between each embodiment and the preceding embodiment(s) are described.

A female element 220 according to a second embodiment of the invention is shown, in a coupled configuration, in FIG. 9a). Whereas in the first embodiment, the circumferential recess 128 is arranged at the front of each lock 140, in the second embodiment, the female element 220 comprises a circumferential bulge 222 which is radially aligned with the internal clamping surface 150 of each lock 140 with respect to the longitudinal axis A100. The circumferential bulge 222 is herein produced by two annular protrusions 224 which are provided protruding from the front portion 124 of the nipple 120. The two protrusions 224 form humps which are located opposite the internal clamping surfaces 150, which improves the holding of the hose 10 when the coupling R is in the coupled configuration.

Advantageously, the annular protrusions 224 and the front portion 124 have a shape matching the internal surfaces 150 of the locks 140, so as to further improve the holding of the hose 10 when the coupling R is in the coupled configuration.

Advantageously, the annular protrusions 224 have a reduced radial protrusion with respect to the front portion 124, the radial protrusion being measured radially to the longitudinal axis A100. The term "reduced radial protrusion" means that an external diameter of the annular projections 224 is less than 110% of an external diameter of the front portion 124, preferentially less than 105% of the external diameter of the front portion 124. In comparison, in the example of the first mode, the radial overshoot of the circumferential bulge 128 is greater than 115%.

Thereby, during the movement of fitting the hose 10 onto the nipple 120, whereas the hose 10 deforms elastically so as to get passed the circumferential bulge, the elastic deformation of the hose 10 required for getting passed the bulge 222 of the second embodiment is less than the elastic deformation of the hose 10 required for getting passed the bulge 128 of the first embodiment. In other words, the force required for fitting the hose 10 onto the nipple 120 and for placing the hose 10 in abutment against the abutment surface 125 is lower in the second mode than in the first mode.

More generally, the annular protrusions 224 of the second embodiment provide both proper retaining of the hose 10 in cooperation with the locks 140, while facilitating the coupling of the female element 220 and of the hose 10.

Figure 9:
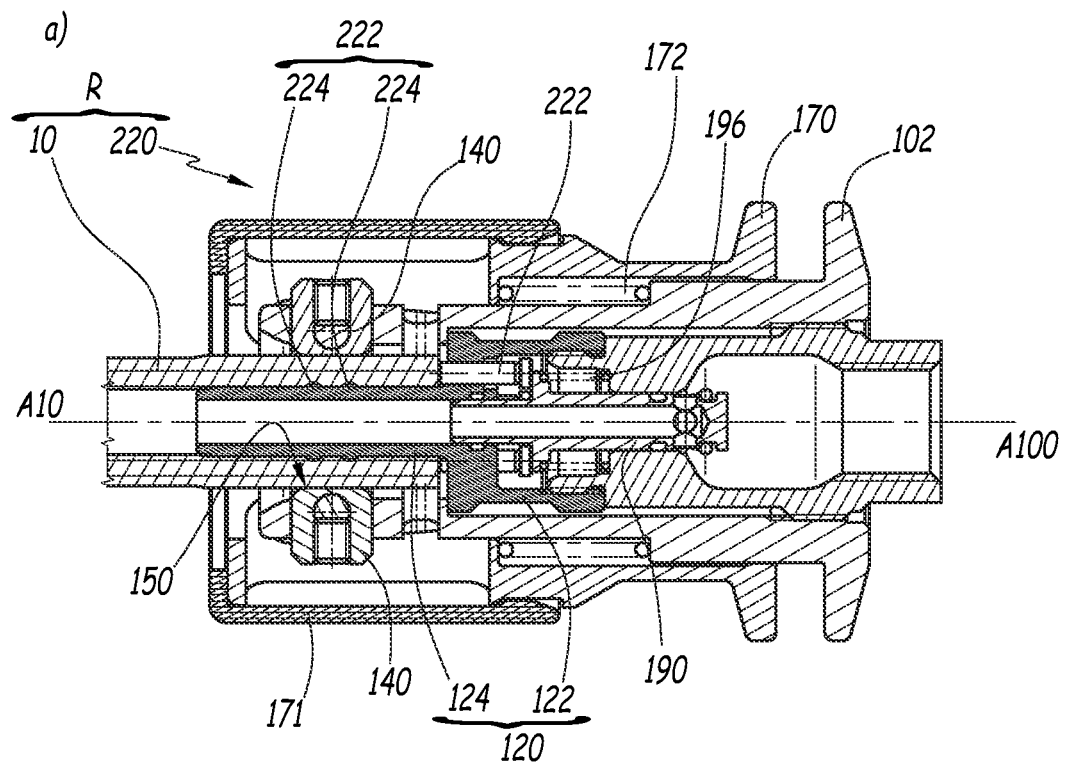
FIG. 9 shows on two inserts a) and b), respectively, a longitudinal section of quick-release couplings according to a second embodiment and a third embodiment of the invention, the quick-couplings being shown in a coupled configuration similar to the configuration of FIG. 8 for the first embodiment.
Figure 9:
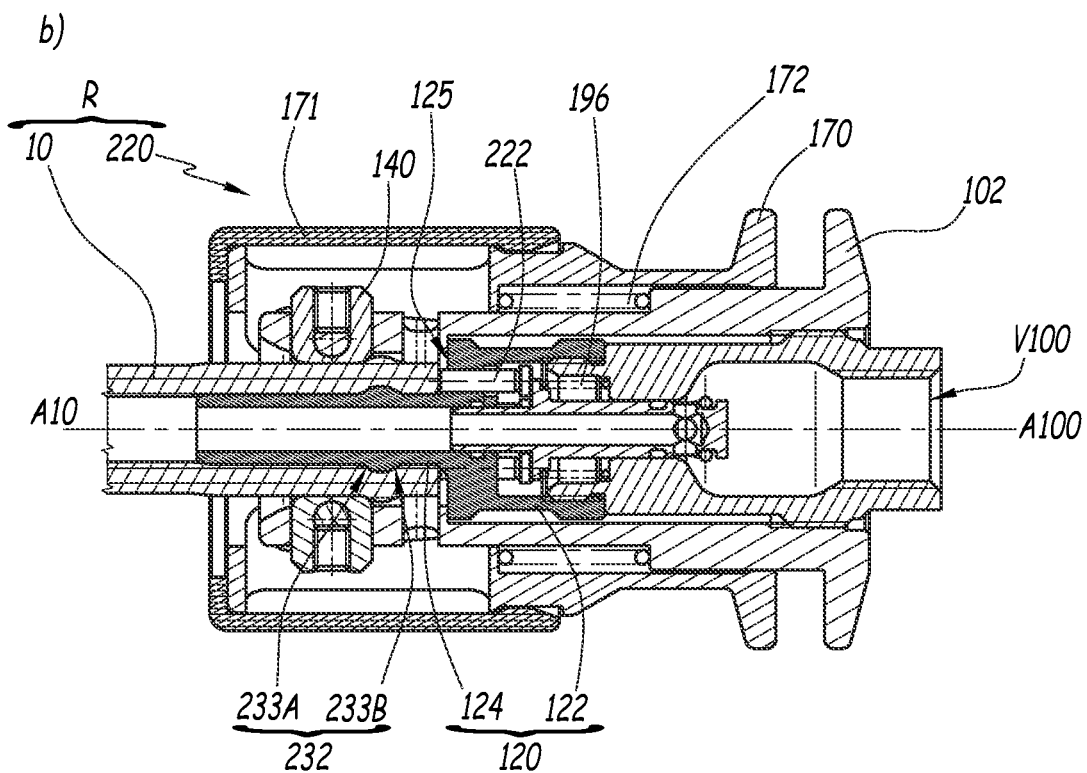

A female element 230 according to a third embodiment of the invention is shown in FIG. 9 b).

The female element 230 comprises a circumferential bulge 232 which is essentially situated at the rear of the locks 140, between the locks 140 and the abutment surface 125. Preferentially, the circumferential bulge 232 is closer, along the longitudinal axis A100, to the abutment surface 125 than to the locks 140. The bulge 232 herein comprises a front ramp 233A which is divergent rearwards, and a rear ramp 233B which is convergent rearwards.

When the coupling R is in the coupled configuration, the arrangement of the circumferential bulge 232 makes it possible to pinch the hose 10 between the front ramp 233A and each lock 140, so as to create a pinching stress inclined with respect to the longitudinal axis A100.

Advantageously, the rear ramp 233B is held at a reduced distance from the abutment surface 125, e.g. the rear ramp 233B and the abutment surface 125 are separated by an interval of 1 cm measured parallel to the longitudinal axis A100, so that the portion of the external surface 12B of the hose 10 acted upon by the locks 140 is close to the front face 14 of the hose 10, reducing the section of hose to be cut if the operator would find it useful to moderately shorten the hose 10, in order to remove only a short end portion of the hose potentially marked by the repeated clamping of the locks 140 of the element 100.

Figure 10:
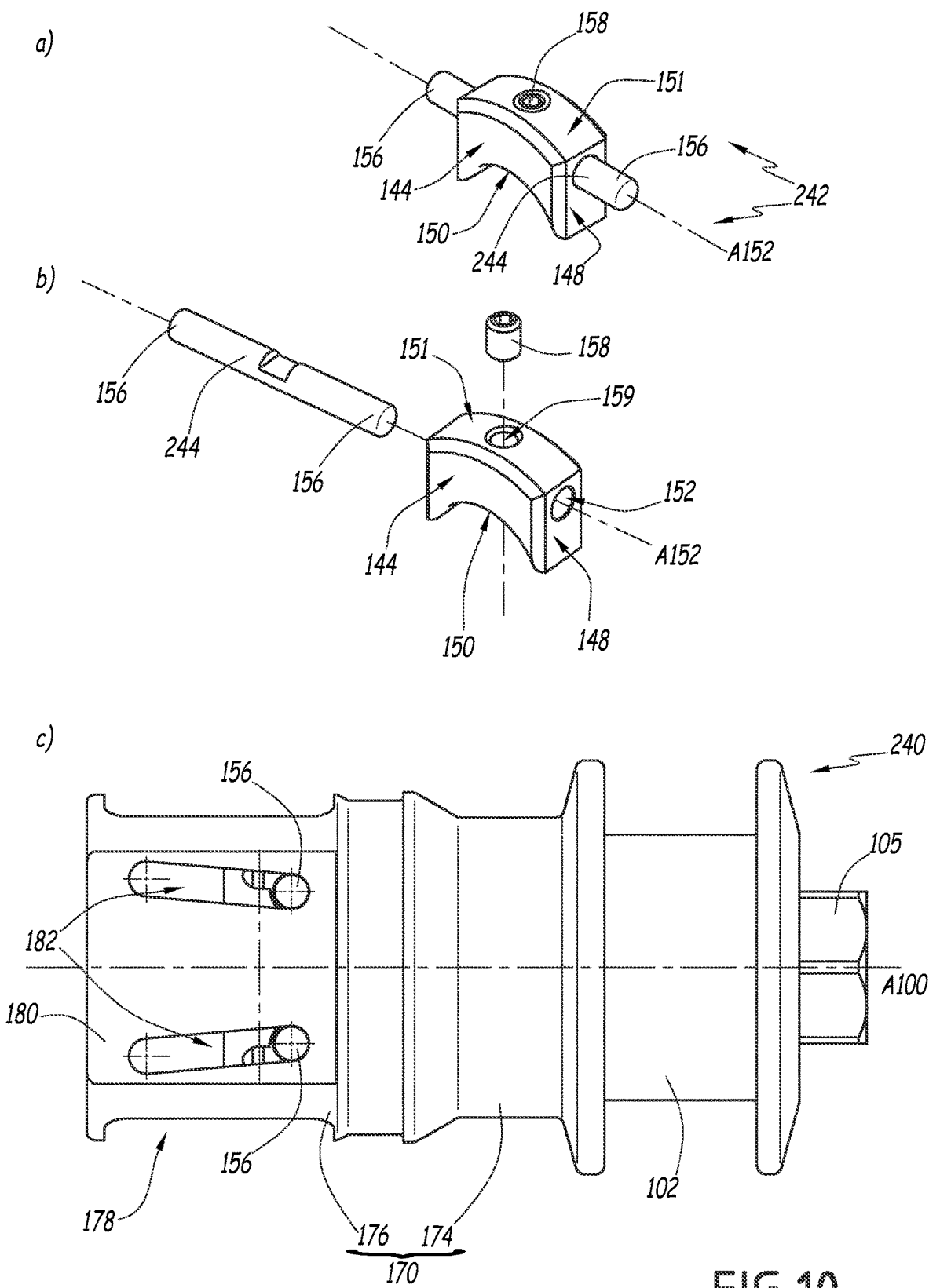
FIG. 10 represents on three inserts a), b) and c), respectively, a lock of a quick-coupling according to a fourth embodiment of the invention, represented correspondingly in perspective and in an exploded perspective, and a side view of the female element of the quick-coupling of the fourth embodiment, some parts being hidden.

A female element 240 according to a fourth embodiment of the invention is shown in FIG. 10, some parts being hidden.

The female element 240 comprises a lock 242, with a rod 244 the ends of which protrude beyond the lateral faces 148 and form the pins 156 which are configured for being directly received in the corresponding guide grooves 182, without a roller such as the rollers 160.

The locks 242 of the second embodiment are easier to manufacture than the locks 140 of the first embodiment but, in the event of wear on the pins 156, the rod 154 should be completely replaced, whereas in the first embodiment only the rollers 160 have to be replaced.

Figure 11:
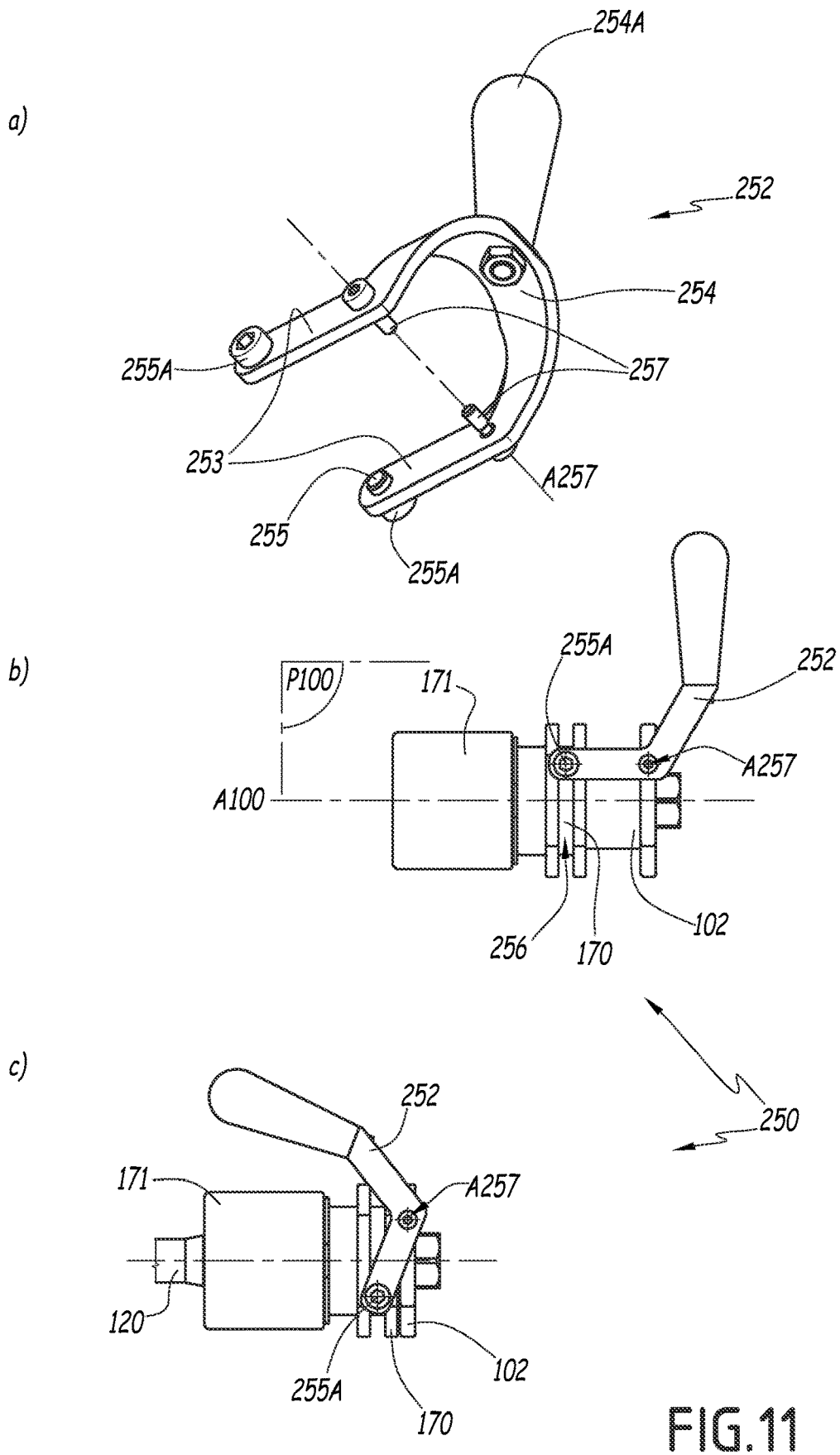
FIG. 11 represents on three inserts a), b) and c), respectively, a lever belonging to a quick-coupling according to a fifth embodiment of the invention, in perspective, in side view in an uncoupled configuration similar to the configuration shown in FIG. 1 for the first embodiment and in side view in a second configuration similar to the configuration shown in FIG. 6 for the first embodiment.

A female element 250 according to a fifth embodiment of the invention is shown in FIG. 11.

The female element 250 of the fifth embodiment comprises a lever 252 which enables the operating ring 170 to be actuated with a lever arm.

In the example illustrated, the lever 252 comprises an arch 252 which has two branches 253 linked by an intermediate portion 254. The arch 252 is mounted astride the body 102 of the female element 250.

The lever 252 comprises a gripping portion, herein a handle 254A which is attached onto the intermediate portion 254. The lever 252 further comprises, at a free end of each of the branches 253, two slides 255 which are arranged opposite each other, and which are each configured for cooperating with a respective groove 256 provided on the outside of the operating ring 170. The grooves 256 are formed on both sides of the longitudinal plane P100 of the female element 250 and each extend along an axis orthoradial to the longitudinal axis A100.

The free ends of the branches 253 and the associated slides 255 together form a guide portion of the lever 252. The slides 255 are advantageously made of a resistant material which reduces friction, in particular a copper alloy, more particularly bronze. The two slides 255 are herein attached to the branches 253 by means of screws 255A.

The lever 252 further comprises two pivot pins 257, each of which being attached to a respective branch 253 between the handle 254A and the corresponding slide 255. The two pivot axes 257 are arranged opposite each other and are aligned along a pivot axis A257 of the lever 252. The two pivot axes 257 are configured for being received in bores provided in the body 102, so that the lever 252 is mounted movable in rotation with respect to the body 102 about the pivot axis A257, the pivot axis A257 being orthoradial to the longitudinal axis A100. The bores receiving the pivot pins 257 are not shown.

The lever 252 is movable in rotation with respect to the body 102 about the pivot axis A257 between a raised position shown in FIG. 11 b) and a lowered position shown in FIG. 11 c).

The handle 254A is configured for being seized by a user, in order to pivot the lever 252 about pivot axis A257 between the raised position thereof and the lowered position thereof. When the lever 252 is moved between the raised position thereof and the lowered position thereof, the slides 255 received in the grooves 256, drive the operating ring 170 in translation along the longitudinal axis A100 between the locking position thereof and the unlocking position thereof, against the compression spring 172 which is not visible in FIG. 11, but which is the same as in the first embodiment. The lever 252 facilitates the movement of the operating ring 170 against the compression spring 172, which consequently makes it possible to use a compression spring 172 applying greater clamping forces on the hose 10, e.g. when the female element 10 is used in pressure applications or for larger diameters of the hose 10.

In the embodiments shown, when the compression spring 172 returns the operating ring 170 towards the locking position thereof, the operating ring 170 drives each lock 140 towards the first position thereof. In other words, the compression spring 172 is a return member, which is configured for returning each lock 140 to the first position thereof. In the embodiments shown, the return member applies to each lock 140, a force having a component centripetal to the longitudinal axis A100 via the operating ring 170.

In a variant (not shown), the return member includes, for each lock 140, a spring which applies directly to each lock 140 a force centripetal to the longitudinal axis A100, so as to return the corresponding lock 140 from the second position thereof to the first position thereof. For example, radial springs are placed between each of the locks 140 and the cover 171, the radial springs being compressed radially to the longitudinal axis A100.

According to another variant (not shown), the compression spring 172 is absent, whereas the female element comprises a lever such as the lever 252, which positively controls the locking and the unlocking of the female element.

In the embodiments shown, the guide grooves 182 move away from the longitudinal axis A100 as same come closer to the front of the female element 100, 220, 230, 240 and 250, whereas the unlocking position of the operating ring 170 is an axially retracted position, along the longitudinal axis A100, with respect to the locking position.

In a variant (not shown), the guide grooves 182 move away from the longitudinal axis A100 as same come closer to the rear of the female element, whereas the unlocking position of the operating ring 170 is an axially forward position, along the longitudinal axis A100, with respect to the locking position.

The shapes of the circumferential bulges 128, 222 and 232 of the first, second and third embodiments are not limiting. More generally, any radial protuberance—rib, ripple, stud, etc.—provided on the front portion 124 of the nipple 120 and configured for cooperating with the locks 140 to hold the hose 10 form a circumferential bulge.

In a variant (not shown), according to a mirror configuration of the third embodiment, a bulge is provided on the internal clamping surface 150 of the lock 140, whereas a circumferential depression is provided as a recess on the nipple 120, so as to pinch the hose 10.

In a variant (not shown), divergent frustoconical internal surfaces 150 are provided on the front side of the coupling. Advantageously, at the coupling according to the present variant, the fitting of the pipe pushes the locks 130 radially against the force of the spring 172 without the operator having to act on the operating ring 170.

The aforementioned embodiments and variants can be combined so as to generate new embodiments of the invention.

What is claimed is:

1. A female element of a quick-coupling, configured for being coupled to a hose, the female element comprising:
a body:
    which extends along a longitudinal axis and which defines a volume for receiving the hose, the receiving volume having a shape of revolution about the longitudinal axis and jutting from the body through a mouth, the mouth defining a front side of the female element,
    which comprises an abutment surface, which is located in a plane orthogonal to the longitudinal axis and which is oriented towards the front of the female element, the abutment surface delimiting the volume for receiving a rear side of the female element, the rear side being opposite to the front side, one nipple:
    which is rigidly attached to the body of the female element and which extends into the receiving volume from the abutment surface,
    which comprises a hollow body having a shape of revolution about the longitudinal axis, the hollow body defining a channel which emerges at the front side of the female element and into a passage provided in the female element on the rear side,
    which comprises an external surface,
wherein the female element further comprises:
    at least one radial opening, each radial opening being provided in the body of the female element along a guide axis radial to the longitudinal axis, each radial opening jutting into the receiving volume,
    at least one lock, each lock being received in a respective radial opening and being movable in translation with respect to the body along the corresponding guide axis between a first position, wherein the lock penetrates into the receiving volume, and a second position, wherein the lock is further away from the longitudinal axis than in the first position, each lock comprising an internal surface for clamping the hose, oriented towards the longitudinal axis opposite the external surface of the nipple,
    a return member configured for returning each lock to the first position thereof, and
    an operating ring, which is arranged around the body coaxially with the longitudinal axis and which is movable in translation with respect to the body along the longitudinal axis between a locking position and an unlocking position, and wherein:
each lock comprises pins, each extending along a direction orthogonal to the corresponding guide axis and orthoradial to the longitudinal axis, the operating ring comprises guide grooves which cooperate with the pins of each lock, the guide grooves associated with each lock being geometrically supported by a guide plane inclined with respect to the longitudinal axis, so that:

each lock is driven from the second position thereof to the first position thereof when the operating ring is moved from the unlocking position thereof to the locking position thereof, and each lock is driven from the first position thereof to the second position thereof when the operating ring is moved from the locking position thereof to the unlocking position thereof.

2. The female element according to claim 1, wherein the return member is configured for returning the operating ring towards the locking position thereof, and wherein the operating ring drives each lock towards the first position thereof when the return member returns the operating ring towards the locking position thereof.

3. The female element according to claim 1, wherein the guide grooves move away from the longitudinal axis as same come closer to the front of the female element, the unlocking position of the operating ring being an axially retracted position, along the longitudinal axis, with respect to the locking position.

4. The female element according to claim 1, wherein the return member applies a centripetal force to each lock which tends to move each lock from the second position thereof to the first position thereof.

5. The female element according to claim 1, wherein the nipple has a circumferential bulge which is radially aligned with the internal clamping surface of each lock with respect to the longitudinal axis.

6. The female element according to claim 1, wherein:
the internal clamping surface of each lock extends geometrically on the rear side of a first clamping plane which is orthogonal to the longitudinal axis,
the nipple comprises a circumferential bulge provided on the external surface of the nipple and situated at the front of the first clamping plane of each lock.

7. The female element according to claim 6, wherein the circumferential bulge comprises:
a flared proximal portion which is divergent towards the front of the female element and which is arranged opposite each lock, and a distal portion diverging toward the rear of the female element.

8. The female element according to claim 7, wherein:
the proximal portion of the bulge is delimited rearwards by a second clamping plane which is parallel to the first clamping plane,
the first clamping plane and the second clamping plane are separated by an interval of less than 5 mm.

9. The female element according to claim 8, wherein:
the first clamping plane and the second clamping plane are separated by an interval of less than 2 mm.

10. The female element according to claim 6, wherein:
the external surface of the nipple comprises a clamping portion which is located at the rear of the proximal portion of the circumferential bulge and which extends opposite the internal clamping surface of each lock, the clamping portion and the internal surface delimit therebetween a clamping annular space, and
the clamping portion has a cylindrical shape of circular cross-section.

11. The female element according to claim 1, wherein the female element comprises:
a valve, which is partially received in the passage and which is movable with respect to the body between a forward position, wherein the valve closes the passage, and a retracted position, wherein the valve does not close the passage,
a second return member, which returns the valve to the forward position, the valve being configured for changing from the forward position to the retracted position when a hose is fitted onto the nipple and abuts against the abutment surface.

12. The female element according to claim 11, wherein:
the body has a housing which emerges onto the abutment surface,
the female element comprises a control member which is received in the housing and which is movable in translation with respect to the body parallel to the longitudinal axis, between a jutting out position, wherein a front portion of the control member is jutting out from the abutment surface, and a retracted position, wherein the front portion does not jut out from the abutment surface,
the control member is configured for pushing the valve from the forward position to the retracted position when the hose is fitted onto the nipple and moves the forward portion of the control member from the jutting out position thereof to the retracted position thereof.

13. The female element according to claim 12, wherein:
the body comprises a first view port,
which extends through the body along a viewing axis radial to the longitudinal axis,
which is provided at the front of the abutment surface,
a first port opening into the receiving volume,
the first port being arranged so as to let the control member in the jutting out position be observed through the first port.

14. The female element according to claim 13, wherein:
the operating ring comprises a second view port which extends through the operating ring along a passage axis parallel to a sighting axis,
the second port is arranged to coincide with the first port, when the operating ring is in the unlocking position, so as to make possible the observation, through the first port, of the control member in the jutting out position.

15. The female element according to claim 14, wherein the operating ring comprises a transparent portion, the transparent portion covering the first port and the second port when the operating ring is in the unlocking position.

16. The female element according to claim 1, wherein:
the female element comprises a lever which is mounted movable in rotation with respect to the body about a pivot axis between a raised position and a lowered position, the pivot axis being orthoradial to the longitudinal axis,
the lever comprises a guide portion which cooperates with the operating ring so as to guide the operating ring from the locking position to the unlocking position, when the lever is driven around the pivot axis thereof between the raised position thereof and the lowered position thereof.

* * * * *